UNITED STATES PATENT OFFICE.

RAYMOND S. WILE, OF PITTSBURG, PENNSYLVANIA.

DETINNING.

No. 859,792.  Specification of Letters Patent.  Patented July 9, 1907.

Application filed October 19, 1906. Serial No. 339,596.

*To all whom it may concern:*

Be it known that I, RAYMOND S. WILE, residing at Pittsburg, in the county of Allegheny and State of Pennsylvania, a citizen of the United States, have invented or discovered a certain new and useful Improvement in Detinning, of which improvement the following is a specification.

The invention described herein relates to certain improvements in the removal of tin from tin plate and its recovery and reduction to merchantable form.

The invention is hereinafter more fully described and claimed.

In the practice of my invention the tin plate usually in the form of scrap is subjected to the action of stannic chlorid whereby the tin is dissolved from the iron or steel, which is not acted on to any material extent by the stannic chlorid. The tin taken up by the stannic chlorid (producing stannous chlorid) is removed from the solution by suitable treatment, whereby the tin recovered assumes a crystalline form.

While not limiting the invention to any particular strength of stannic chlorid solution, it should have a strength sufficient to take up a maximum amount of tin without materially attacking the iron or steel. These conditions seem to be filled by fifteen to twenty-five per cent solutions an approximately twenty per cent (20%) solution giving the best results. The tin plate is placed in this solution, which is agitated so as to facilitate the removal of the tin. An apparatus such as is used in pickling sheet iron or steel can be conveniently used in carrying out my process. An addition of hydrochloric acid to the solution increases the efficiency of the process, not only during the solution of the tin but also while the latter is being separated from the solution where the solution is reconverted to stannic chlorid.

To remove the tin from the solution, the latter is subjected to treatment, as the action of an electric current, whereby the tin will separate from the solution not in a compact metallic form nor in a spongy form but in a white crystalline form. It is preferred to add an amount of hydrochloric acid to the stannic chlorid solution to maintain the same in such an acid condition as to insure the separation of the tin from the solution in a crystalline form in contra-distinction to a compact or spongy form.

While the effect of the hydrochloric acid is more pronounced during the electrolytic action of the stannous chlorid, the efficiency of the process is increased by adding the hydrochloric acid before or during the dissolving of the tin, or while the stannic chlorid is being converted to stannous chlorid. I find in practice that the best results are obtained by adding from five tenths to five per cent of hydrochloric acid. After the tin has been removed, the stannous chlorid thus produced is subjected to electrolytic action, the solution being preferably transferred to a number of small vats in order to hasten the removal of the tin. The anode employed should be formed of some material as carbon, insoluble in the bath. By the action of the current, which preferably is about four volts and a current strength of about one ampere per square inch of cathode, the tin taken up by the solution is deposited on the cathode in the form of silvery white crystals.

As soon as the solution has been reconverted to stannic chlorid by the removal of the tin, the electrolytic treatment is stopped and the solution returned to the pickling bath, for the treatment of another quantity of tin plate.

After the solution has become unfit for use in my process, it is mingled with a large quantity of pure water, whereby the tin contained in the solution is precipitated in the form of stannic oxid, a commercially valuable product.

By the addition of hydrochloric acid the removal of the tin from the plate is materially hastened, but the greatest benefit is derived in maintaining the crystalline character of the deposit during the electrolytic treatment.

I claim herein as my invention:

1. The herein described process of detinning, which consists in dissolving the tin in a solution and subjecting such solution to the action of a current of sufficient voltage to cause the separation of the tin, said solution consisting of stannic chlorid having hydro chloric added thereto.

2. The herein described process of de-tinning which consists in dissolving the tin in a solution of stannic chlorid producing stannous chlorid, adding hydrochloric acid to the latter, and separating the tin from the stannous chlorid by the action of a current of sufficient voltage to cause the tin to assume on separation a crystalline form.

3. The herein described process of de-tinning which consists in dissolving the tin in a solution of stannic chlorid having at least a fifteen per cent concentration, thereby producing stannous chlorid, adding hydrochloric acid and separating the tin from the acid solution by the action of an electric current of sufficient voltage to cause the tin to assume a crystalline form.

4. The herein described process of de-tinning, which consists in changing a solution of stannic chlorid having at least a fifteen per cent concentration and containing hydrochloric acid, to a mixture of stannous chlorid and hydrochloric acid by the addition of tin to the first mixture and then subjecting such solution to the action of a current of sufficient voltage to cause the separation of tin in a crystalline form, thereby restoring the bath to its original condition.

5. The herein described process of de-tinning, which consists in dissolving tin in a solution of stannic chlorid having at least a fifteen per cent concentration, thereby hydrochloric acid added thereto, and then removing the tin from such solution by the action of a current of sufficient voltage to cause the separation of the tin in a crystalline form.

6. The process herein described, which consists in dissolving tin in a solution of stannic chlorid having at least a fifteen per cent concentration and having hydrochloric acid added thereto, removing the tin by electrolytic action, and mingling the solution, after the electrolytic removal of the tin with water, whereby stannic oxid is precipitated.

In testimony whereof, I have hereunto set my hand.

RAYMOND S. WILE.

Witnesses:
 CHARLES BARNETT,
 J. HERBERT BRADLEY.